Patented Dec. 6, 1927.

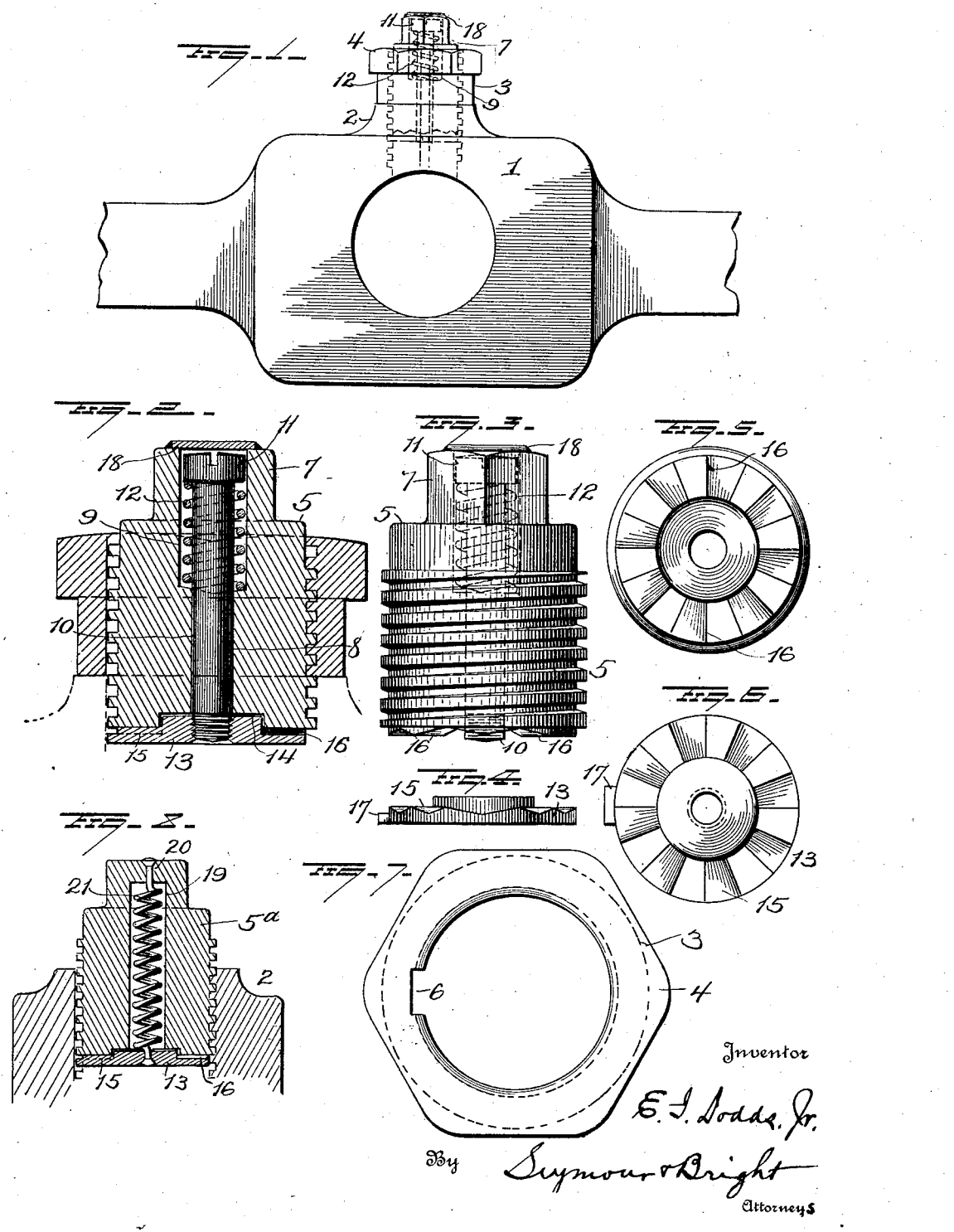

1,652,098

UNITED STATES PATENT OFFICE.

ETHAN I. DODDS, JR., OF CENTRAL VALLEY, NEW YORK, ASSIGNOR, BY MESNE ASSIGNMENTS, TO FLANNERY BOLT COMPANY, OF PITTSBURGH, PENNSYLVANIA, A CORPORATION OF DELAWARE.

LUBRICATOR.

Application filed February 26, 1923. Serial No. 621,379.

This invention relates to improvements in lubricators and more particularly to those of the "force feed" type in which hard grease is employed,—one object of the invention being to so construct a lubricator having a threaded plug or plunger member, that the latter shall be prevented from working loose, but so that said plunger may be moved forwardly to put pressure on the grease or move backwardly to permit the introduction of grease into the cup member without necessitating, in either case, the application of such an amount of force as might injure or disrupt the threads or other parts of the structure.

A further object is to so construct a lubricator of the type specified that it shall be particularly well adapted for application to a link in the driving mechanism of a locomotive, and in which the parts which operate to hold the plunger against longitudinal movement in either direction, shall be protected and normally out of reach of anything which might strike or otherwise injure the same.

With these and other objects in view, the invention consists in certain novel features of construction and combinations of parts as hereinafter set forth and pointed out in the claims.

In the accompanying drawings,—

Figure 1 is a view in elevation showing an embodiment of my invention.

Figure 2 is a sectional view.

Figure 3 is a view in elevation showing the plunger.

Figure 4 is a view in elevation of the separate plunger-disk or head.

Figure 5 is a bottom plan view of the plunger.

Figure 6 is a top plan view of the plunger-disk or head.

Figure 7 is a top plan view of the cup member of the device, and

Figure 8 is a sectional view showing another embodiment of the invention.

A link such as employed in locomotive driving mechanism as indicated at 1 and may be provided with an integral boss 2 which forms a portion of the cup member of my improved lubricator. The body portion 3 which also forms a part of said cup member is mounted against the boss 2 and these parts will preferably be welded together. The body 3 may, if desired, be provided with an angular head 4 and said body may be sufficient in length and provided with external threads (not shown) to enter a threaded hole in the link 1,—in which case the boss 2 on the link may be omitted.

The cup member, comprising the parts 2 and 3, is internally threaded for the accommodation of an externally threaded plug or plunger 5 and the inner wall of said cup member is provided with a longitudinal groove 6 for a purpose hereinafter explained.

The plug member 5 is provided at one end with an angular, wrench-receiving head 7 and said plunger and head are formed with central bores 8—9 through which a rod or bolt 10 passes, the head 11 of said bolt being disposed within the bore 9 and near the free end of the head 7. A spring 12 disposed within the larger bore 9 bears against the bolt head 11 and against a seat formed by the lower end of the bore 9. The spring actuated bolt 10 carries at its lower or inner end, a separate plunger-disk or head 13 having an enlarged central portion which may enter a recess 14 in the plug or plunger. The upper surface of the disk or head 13 is made with an annular series of cams 15 and the lower end of the plunger 5 is made with a similar annular series of cams 16 with which the cams 15 of the disk may mesh. The shoulders on the disk and plunger which form the said cams are all inclined so that the plunger may be permitted to be turned in either direction by the application of sufficient force when the disk or head 13 is prevented from turning. Turning movement of the head or disk 13 is prevented by means of a lug 17 projecting from the same and entering the longitudinal groove 6 in the wall of the cup member of the device. The bore 9 which contains a portion of the bolt 10, its head 11 and spring 12, is closed by a plate 18 welded to the part 7 of the plug or plunger, and thus the bolt will be protected within the plug or plunger member and access thereto by unauthorized persons will be prevented.

With my improvement, turning force may be applied to the plug or plunger in one direction to cause the disk or head 13 to move downwardly and apply pressure to the grease within the cup or it may be turned in the reverse direction to cause upward movement of said disk or head and permit the introduction of grease into the cup when said plunger and its head or disk 13 shall have been removed from the cup. Normally the co-acting cam devices 15 and 16 will prevent accidental turning of the plug in either direction but will permit such turning to move the head or disk 13 in either direction, by the application of a comparatively small amount of force.

In the form of my improvement shown in Figure 8, the cup portion of the device may consist solely of the integral boss 2. In this form of the invention, the bolt 10 and spring 12 may be dispensed with and the plug or plunger 5$^a$ may be formed with a central bore 19 closed at its outer end by the headed portion 20 and a spring 21 housed in said bore is connected at one end with the head 20 of the plunger and at its other end with the disk 13,—said disk and plunger being provided with annular series of co-acting cams, the same as hereinbefore described.

Having fully described my invention what I claim as new and desire to secure by Letters-Patent, is:

1. In a lubricator, the combination with a cup member, of a plug member fitted in the cup member and engaged therewith to move longitudinally when rotated, said plug member being free of radial projections, a holding disk at the inner end of the plug member, said plug member being rotatable in either direction relative to the disk and having a central bore the outer end of which is permanently closed, means whereby the disk will normally hold the plug member against turning, and a spring housed in said bore and operating between the plug and the disk to hold the disk normally to the plug.

2. In a lubricator, the combination with a cup member, and a plug mounted therein to move longitudinally when rotated, a locking disk at the inner end of the plug, the plug being rotatable in either direction relative to the disk, means whereby the disk will normally prevent movement of the plug, a rod secured at its lower end to the disk passing through the plug and provided with a head at its upper end, and an expansion spring permanently enclosed in the plug and bearing between the same and the head of the rod, the entire bottom area of the cup member being open whereby the plug and the disk may be moved entirely through the cup member.

In testimony whereof, I have signed this specification.

ETHAN I. DODDS, Jr.